United States Patent [19]
Dalnodar

[11] Patent Number: 5,504,400
[45] Date of Patent: Apr. 2, 1996

[54] TWO-CHANNEL AC LIGHT DIMMER AND LIGHTING SYSTEM

[76] Inventor: David C. Dalnodar, 139 Hillcrest Dr., Wayne, N.J. 07470

[21] Appl. No.: 311,042

[22] Filed: Sep. 23, 1994

[51] Int. Cl.⁶ .................................................. H05B 37/00
[52] U.S. Cl. ........................ 315/291; 315/312; 315/323; 315/250; 315/287
[58] Field of Search .................................... 315/291, 308, 315/312, 322, 323, 362, 250, 287

[56] References Cited

U.S. PATENT DOCUMENTS

| | | |
|---|---|---|
| 3,148,305 | 9/1964 | Pearson . |
| 3,450,893 | 6/1969 | Munson . |
| 3,823,339 | 7/1974 | Borneman et al. . |
| 3,963,956 | 6/1976 | Beining . |
| 4,560,909 | 12/1985 | Piel . |
| 4,897,578 | 1/1990 | Goad, Sr. . |

OTHER PUBLICATIONS

Teccor Electronics, Inc. parts catalogue No. 110, "General Catalog–Semiconductors" (1988), pp. 111–112.
Package insert accompanying "The Button®." (Nov. 1993).

Primary Examiner—Robert J. Pascal
Assistant Examiner—Reginald A. Ratliff
Attorney, Agent, or Firm—Wayne S. Breyer

[57] ABSTRACT

An electronic AC light dimmer, lighting system and method are disclosed that provide two-channel operation by allowing independent control of positive and negative half cycles of AC power. In one embodiment, the dimmer comprises a positive half-cycle control circuit for controlling an mount of current flowing through the dimmer during positive half-cycles and a negative half-cycle control circuit for controlling an mount of current flowing through the dimmer during negative half-cycles. In a further embodiment of the invention, the dimmer is wired to at least two light bulbs that are part of a common circuit, and a channel selection circuit. Preferably, the channel selection circuit comprises at least two diodes, each diode connected in series with one of the bulbs. The action of the dimmer and the diodes provides two channels, each channel being associated with either positive or negative half cycles. The polarity of the diode determines whether positive or negative half cycles provide current to the bulb, thereby establishing the bulb's assignment to one of the two channels.

28 Claims, 9 Drawing Sheets

TWO-CHANNEL AC LIGHT DIMMER AND LIGHTING SYSTEM

FIELD OF THE INVENTION

The present invention relates generally to electronic light dimmers, and more specifically to a light dimmer that provides independent control of two sets of light bulbs that share a common AC circuit.

DESCRIPTION OF THE PRIOR ART

Electronic light dimmers are commonplace items in residential and commercial lighting installations. They are especially popular where a dramatic lighting effect is desired, as is often the case when lighting fixture selection and placement are elements of a decorating scheme. Products frequently used in these applications, such as track lighting, recessed lighting and chandeliers, typically employ a plurality of light bulbs to enhance the dramatic effect as well as to provide lighting.

In these and other multi-bulb applications, a portion of the bulbs may be used for a particular service, and the remaining bulbs used for another service. For example, some of the bulbs may be used to accent wall hangings or other art objects, while the remaining bulbs may be oriented to provide reading light. In such a situation, it is advantageous to group the bulbs into two independently-controllable channels or circuits. This allows controlling the brightness of one channel of bulbs independently of the other channel. The brightness of the bulbs in a given channel may be varied using a dimmer. Conventional dimmers are single channel devices. Controlling a two-channel lighting installation using conventional dimmers therefore typically requires two dimmers, one assigned to each channel. Significant drawbacks, which will be discussed below, are associated with such an approach.

For example, where a plurality of recessed lights are used in a two-channel system using conventional dimmers, each fixture generally must be wired to a particular dimmer during installation. Careful thought must be given to the channel assignment of each fixture, since future reassignments may necessitate rewiring both circuits. In the case of two-channel track lighting, channel assignment of the light fixtures mounted on the track is readily changed provided that a relatively expensive two-circuit track is used instead of a less expensive single-circuit track. In either of these cases, the complexity of having two distinct circuits or channels controlled by separate dimmer switches results in added expense relative to a single circuit installation.

In chandeliers and other decorative fixtures containing multiple bulbs, only one circuit is typically available, thereby prohibiting two-channel control of the bulbs within the fixture. The fixture generally must be rewired if two-channel control is desired.

In addition, conventional dimmers offer no means to easily convert an existing single-channel lighting installation to two-channel operation. Such dimmers simply control the brightness of bulbs to which they are wired. To convert to two-channel operation, a second circuit typically must be added and the lighting rewired.

Thus, a typical prior art approach utilizes two circuits and two dimmers to independently control the brightness of two sets of bulbs in a lighting system. As discussed above, there are significant drawbacks related to cost, ease of installation and flexibility associated with such an approach. A need therefore exists for an electronic light-dimming system that provides economical two-channel control for both new and existing lighting installations, that does not require two-circuit wiring and two dimmers, and that provides flexible channel assignments to accommodate changing lighting requirements.

SUMMARY OF THE INVENTION

The aforementioned need is met by a novel electronic AC light dimmer that provides two-channel operation by allowing independent control of positive and negative half cycles of AC power. In one embodiment, the dimmer comprises a positive half-cycle control circuit for controlling an amount of current flowing through the dimmer during positive half-cycles and a negative half-cycle control circuit for controlling an amount of current flowing through the dimmer during negative half-cycles.

In a further embodiment of the invention, the dimmer is wired to at least two light bulbs that are part of a common circuit, and a channel selection circuit. Preferably, the channel selection circuit comprises at least two diodes, each diode connected in series with one of the bulbs. The action of the dimmer and the diodes provides two channels, each channel being associated with either positive or negative half cycles. The polarity of the diode determines whether positive or negative half cycles provide current to the bulb, thereby establishing the bulb's assignment to one of the two channels.

An object of the present invention is to allow independent control of the brightness of two channels of AC powered bulbs, where the bulbs are part of a common circuit.

A second object of the invention is to allow existing lighting installations to be converted to two-channel control without replacing fixtures or adding an additional circuit.

A third object of the invention is to create a dimmer circuit that may be readily manufactured in the approximate size and shape of conventional dimmers.

A fourth object of the invention is to provide two-channel control at a cost that is relatively low when compared to the cost of either two-circuit track or two-circuit recessed lighting, especially when the cost of converting an existing system is considered.

A fifth object of the invention is to allow each bulb in the circuit to be assigned to either channel as desired, and further to permit channel assignments to be easily changeable to accommodate changing lighting requirements.

A sixth object of the invention is to facilitate converting virtually any lighting fixture with multiple bulbs to two-channel control, even though the two-channel control is not normally associated with the application.

BRIEF DESCRIPTION OF THE DRAWINGS

Other features and objects of the present invention will be more readily understood from the following detailed description of specific embodiments thereof when read in conjunction with the accompanying figures in which.

DETAILED DESCRIPTION OF THE INVENTION

Figure 1:
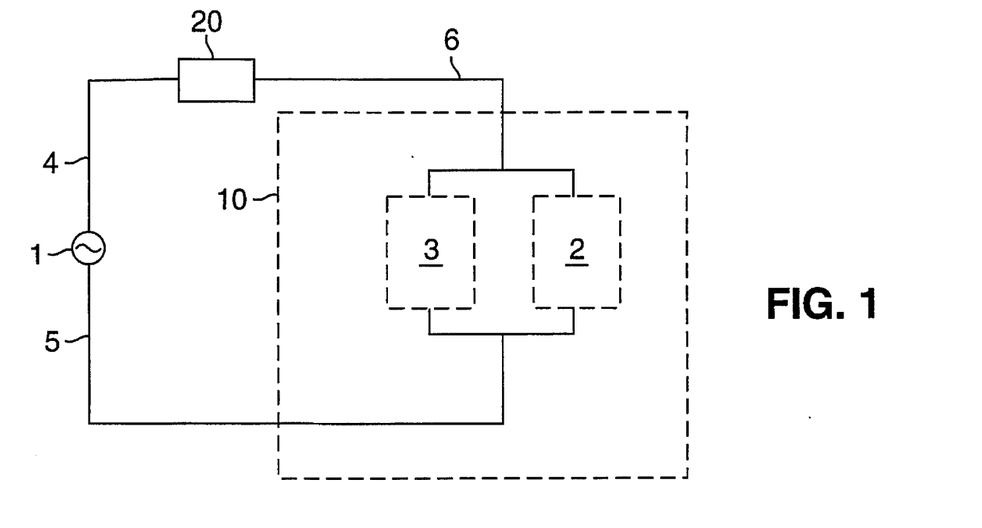
FIG. 1 is a block diagram of an embodiment of a light dimming system according to the present invention.

Referring to FIG. 1, the elements of an embodiment of a dimmer according to the present invention are contained within the dashed line denoted by the reference numeral 10. The dimmer 10 controls the current flowing to a load 20. A generator 1 represents an AC power source, which is herein assumed to be a 120 Volt 60 Hz power source. The polarity markings on generator 1 are provided for reference, and indicate the polarity of the instantaneous voltage produced by the generator 1 during a positive half cycle. Conductors 4, 5 and 6 would typically be permanently installed branch circuit wiring, with the conductor 4 being neutral, the conductor 5 being hot, and the conductor 6 being hot (switched).

The dimmer 10 comprises a positive half-cycle control circuit 2 and a negative half-cycle control circuit 3. The positive half-cycle control circuit 2 controls the amount of current flowing through the dimmer 10 during positive half-cycles of AC power. Similarly, the negative half-cycle control circuit 3 controls the amount of current flowing through the dimmer 10 during negative half-cycles of AC power. The word "circuit" as used in this specification refers to either an arrangement of elements or devices, or a single element or device.

Figure 2:
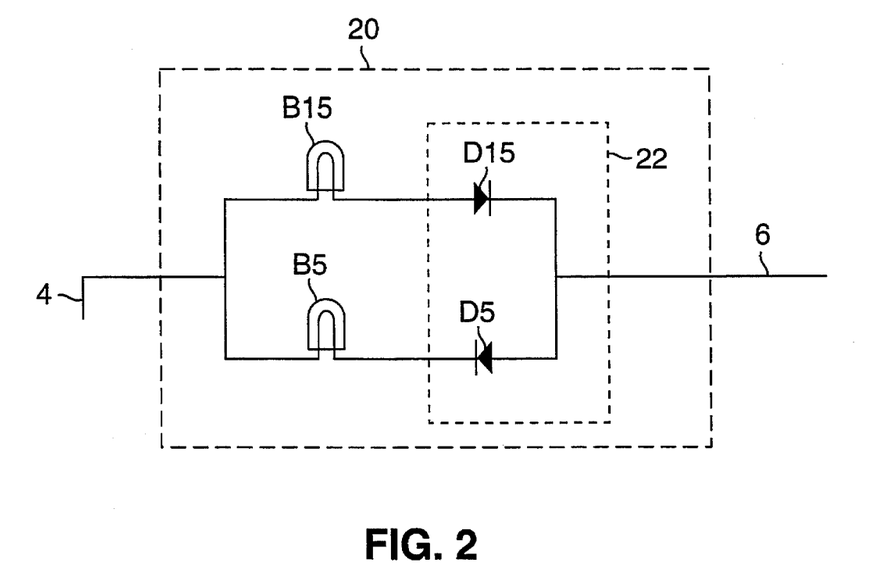
FIG. 2 is a schematic of an exemplary embodiment of a load comprising light bulbs and channel selection circuit comprising a diode wired in series with each light bulb.

Referring to FIG. 2, the load 20 for the dimmer 10 may comprise light bulbs B5, B15, and a channel-selection circuit 22. The channel-selection circuit 22 determines whether positive or negative half-cycles of current will energize the bulbs B5, B15. The action of the dimmer and the channel-selection circuit thus provides two channels, each channel being associated with either positive or negative half cycles. For the purposes of this specification, the two channels will therefore be referred to as the positive and the negative channel. The load 20 generally includes at least one bulb per channel.

In a preferred embodiment, the channel-selection circuit 22 comprises at least two diodes, one per channel (this assumes that a lighting system will have at least one bulb per channel). Each diode is connected in series to a bulb. For example, in FIG. 2, the bulbs B5 and B15 are series connected with the diodes D5 and D15, respectively. The polarity of each diode determines whether positive or negative half cycles of current will energize the corresponding bulb. Hence, the bulb B15 will be energized during positive half cycles, i.e., when the voltage at the conductor 4 is positive with respect to the voltage at conductor 6, due to the diode D15. The bulb B5 will be energized during negative half cycles due to the diode D5.

Figure 3:
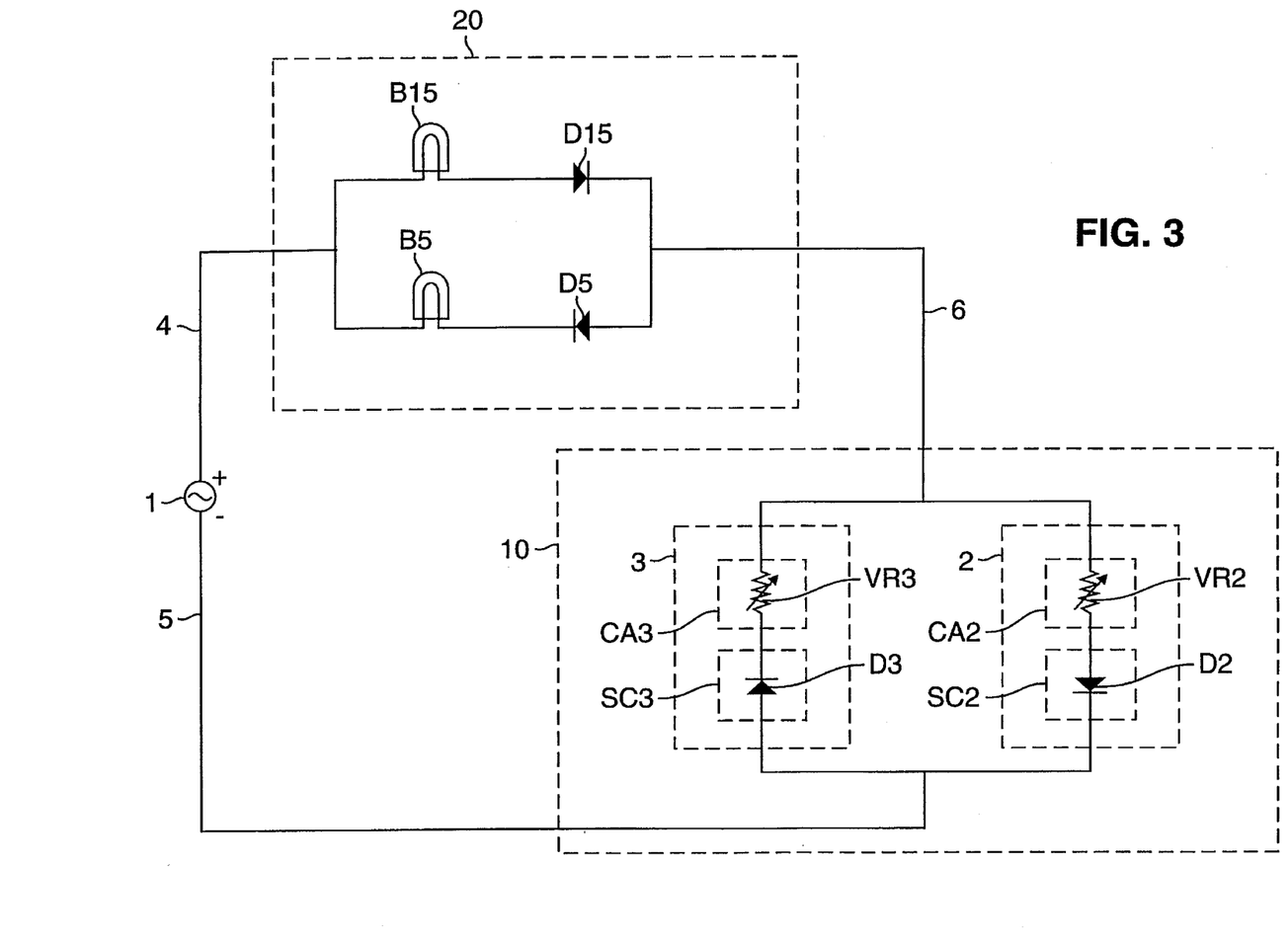
FIG. 3 shows an exemplary embodiment of a light dimming system according to the present invention.

In the exemplary embodiment of the dimmer 10 shown in FIG. 3, each of the half-cycle control circuits 2, 3 are comprised of a steering circuit SC2, SC3 and a current-adjustment circuit CA2, CA3. Without limitation, the steering circuit may be a diode, such as diodes D2 and D3, and the current-adjustment circuit may be a variable resistor VR2, VR3, such as a rheostat or a potentiometer.

Thus, in the exemplary embodiment of the dimmer 10 shown in FIG. 3, the positive half-cycle control circuit 2 is comprised of a diode D2 and a rheostat VR2. A diode D3 and a rheostat VR3, comprise the negative half-cycle control circuit 3. The polarity of the diodes D2 and D3 determines which rheostat, VR2 or VR3, controls during positive or negative half cycles. According to the exemplary embodiment of FIG. 3, the diodes D15 and D2 will be forward biased and the diodes D5 and D3 will be reverse biased during the positive half-cycle. Thus, the rheostat VR2 will control the amount of current flowing through bulb B15 during positive half-cycles. During negative half-cycles, the diodes D5 and D3 will be forward biased and the diodes D15 and D2 will be reverse biased. Thus, the rheostat VR3 will control the amount of current flowing through bulb B5 during negative half-cycles.

As will be appreciated by those skilled in the art, since adjusting the current through the load is equivalent to adjusting the voltage applied to the load, a voltage adjustment circuit could be used in place of a current adjustment circuit.

Figure 4:
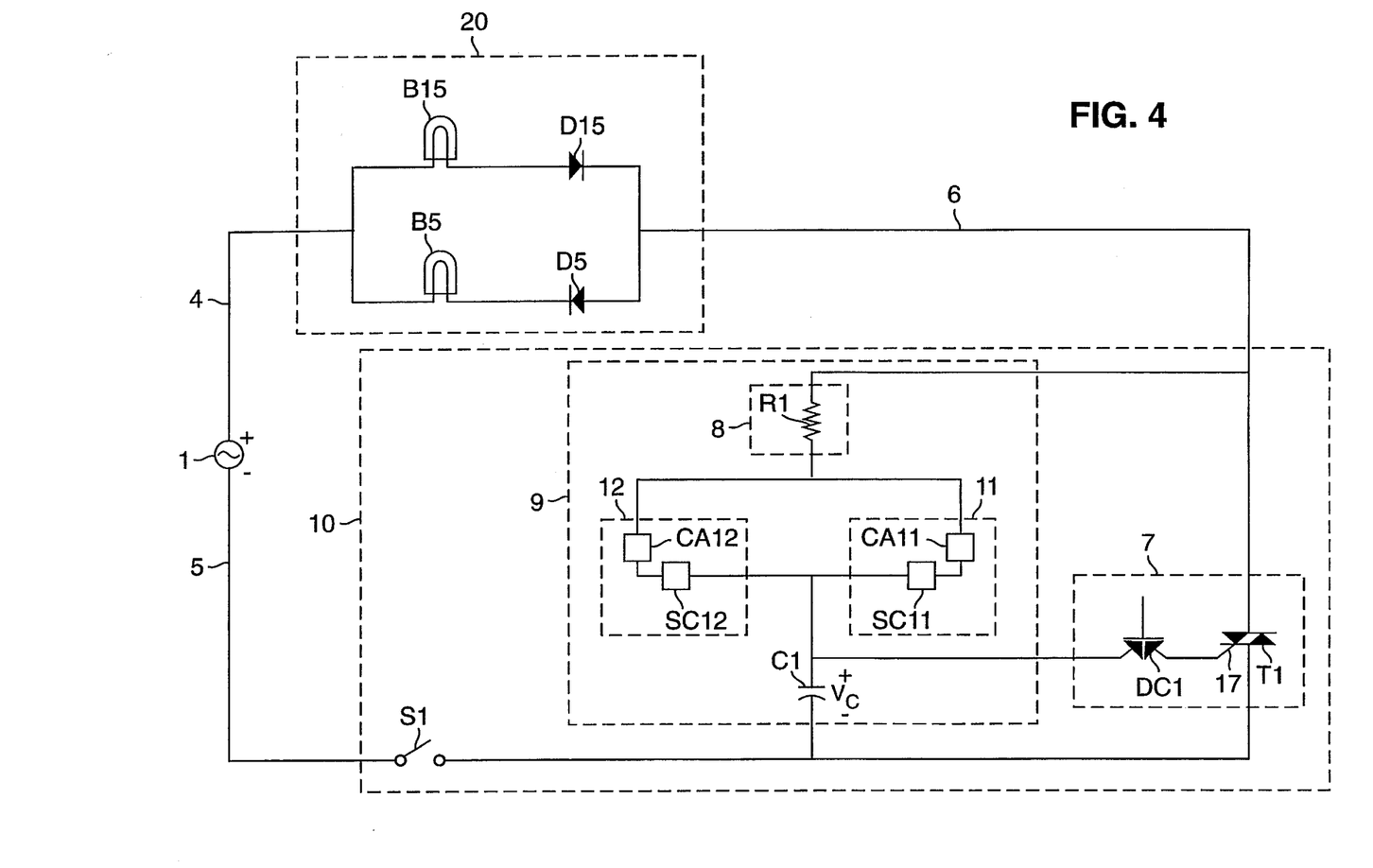
FIG. 4 shows a preferred embodiment of a light dimming system according to the present invention, in which the dimmer contains a triggering circuit and a load switching circuit.

In a preferred embodiment, the dimmer 10 is implemented as a phase-controlled switch, and includes a load-switching circuit 7 and a triggering circuit 9 as shown in FIG. 4. As will be discussed in more detail below, the positive half-cycle control circuit 2 comprises the load switching circuit 7 and a first part of the triggering circuit 9 and the negative half-cycle control circuit 3 comprises the load switching circuit 7 and a second part of the triggering circuit 9. The phase-controlled switch generally dissipates less power than the embodiment of the dimmer shown in FIG. 3.

The load-switching circuit 7 delivers current to the load 20 for a portion of each half-cycle. This portion is typically measured in terms of a conduction angle, which ranges from 0 degrees (no current delivered to the load 20) to 180 degrees (complete half-cycle of current delivered to the load 20). The conduction angle is determined by the triggering circuit 9, which allows for the independent adjustment of conduction angles during positive and negative half-cycles.

Figure 5A:
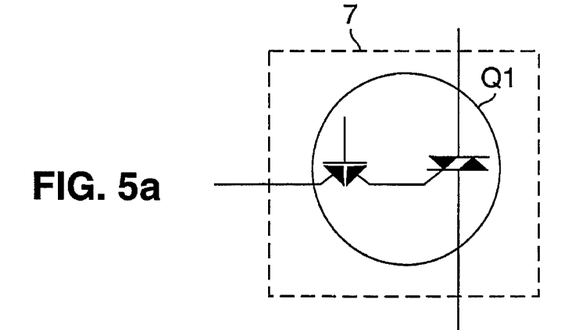
FIG. 5a is a schematic of a preferred embodiment of a load switching circuit.

In an exemplary embodiment shown in FIG. 4, the load switching circuit 7 includes a diac DC1 and a triac T1. The triac T1 is series connected with an optional on-off switch S1, assumed to be closed for the purposes of the following discussion, the power 1 and the load 20. The diac DC1 and triac T1 may be replaced by a single quadrac, Q1, as shown in FIG. 5a.

The triggering circuit 9 of the exemplary embodiment shown in FIG. 4 includes a capacitor C1, a positive half-cycle charge-rate control circuit 11, a negative half-cycle charge-rate control circuit 12, and a current-limiting circuit 8.

Figure 5B:
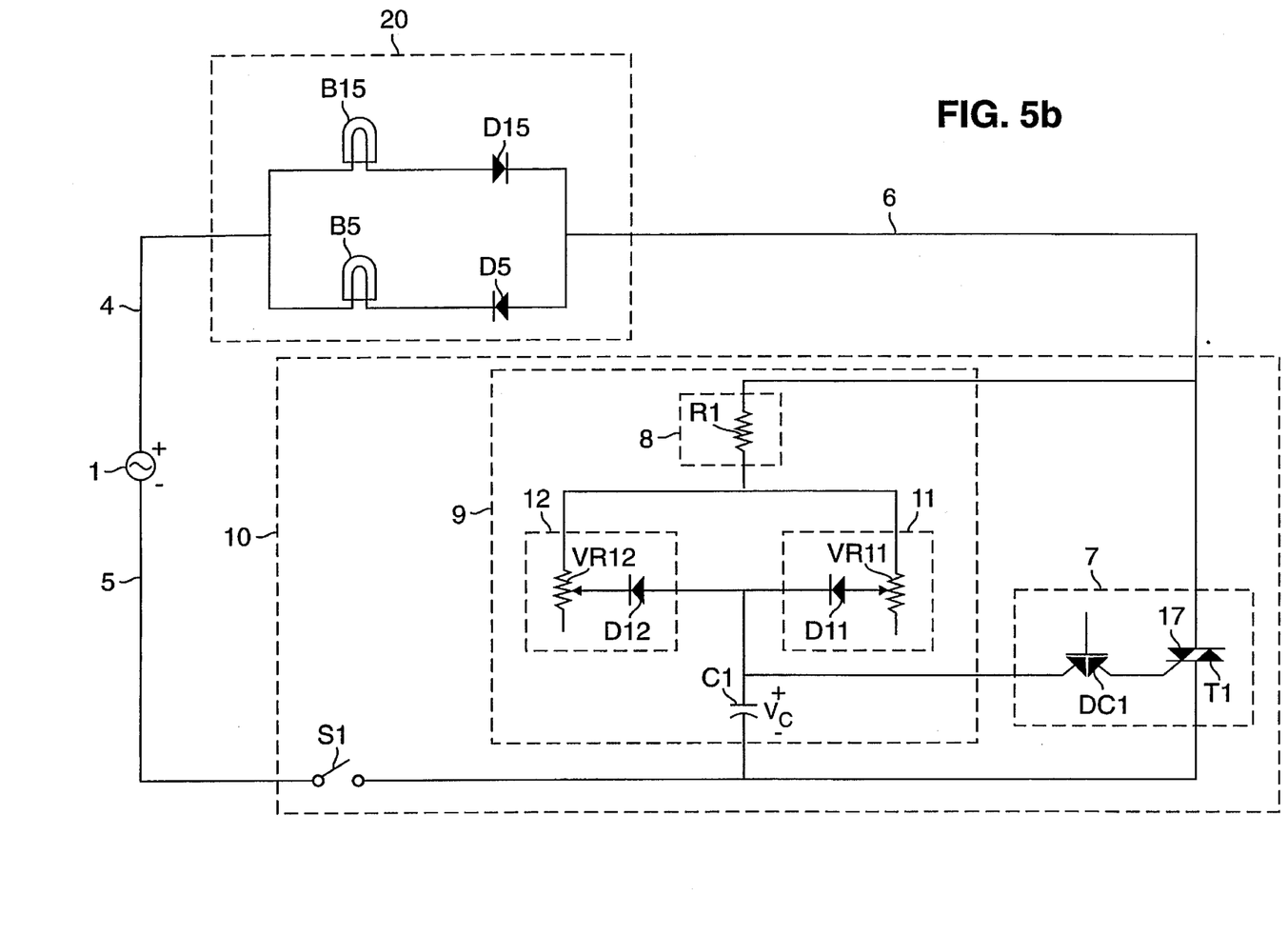
FIG. 5b is a schematic of an embodiment of the light dimming system of FIG. 4 wherein half-cycle charge-rate control circuits each comprise a diode and a potentiometer.
Figure 5C:
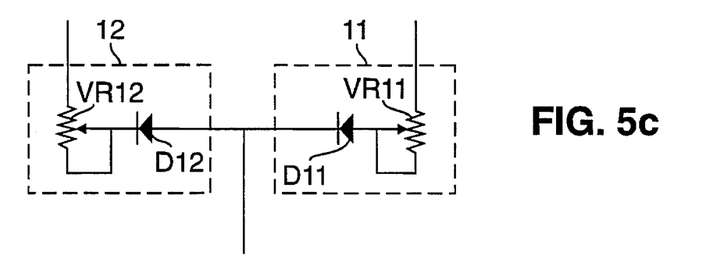
FIG. 5c illustrates an alternate wiring arrangement for the potentiometer of each of the half-cycle charge-rate control circuits.
Figure 5D:
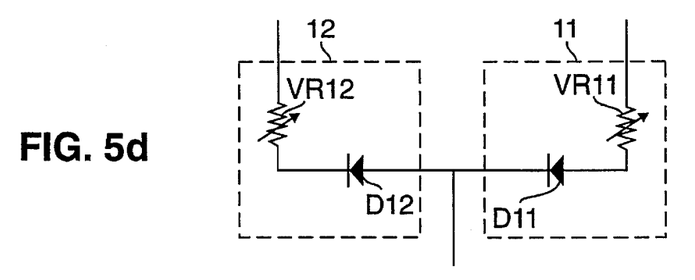
FIG. 5d is a schematic of a portion of the triggering circuit of FIG. 4 wherein the half-cycle charge-rate control circuits each comprise a diode and a rheostat.
Figure 5E:
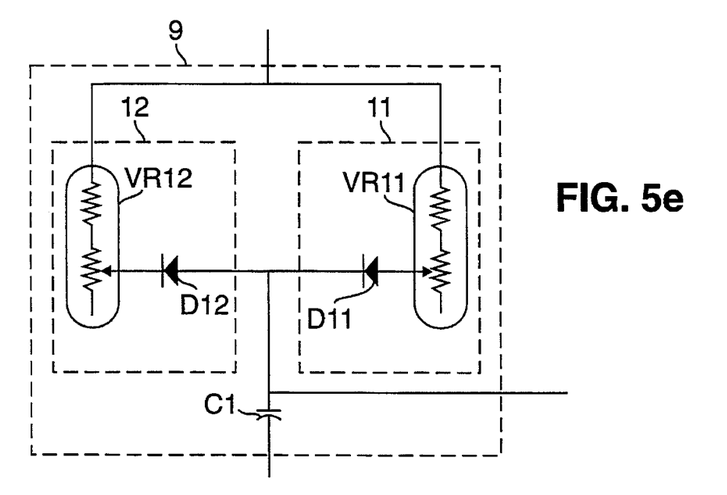
FIG. 5e is a schematic of a triggering circuit wherein the half-cycle charge-rate control circuits each comprise a diode and a minimum value potentiometer.

The positive half-cycle charge-rate control circuit 11 includes a current-adjustment circuit CA11 and a steering circuit SC11. Likewise, the negative half-cycle charge-rate control circuit 12 includes a current-adjustment circuit CA12 and a steering circuit SC12. Without limitation, the steering circuit may a diode D11, D12, as shown in the exemplary embodiments of FIGS. 5e–5e, and the current-adjustment circuit may be a variable resistor, VR11, VR12. Without limitation, the variable resistor VR11, VR12 may be a potentiometer as shown in the exemplary embodiment of FIG. 5b, or a potentiometer with the alternate connection shown in FIG. 5c, a rheostat as shown in the exemplary embodiment of FIG. 5d, or a minimum value potentiometer (or rheostat) as shown in FIG. 5e.

In a preferred embodiment, the triggering circuit 9 also includes a current-limiting circuit 8, such as, without limitation, a resistor R1. The current-limiting circuit 8 ensures that the rated power dissipation of the variable resistors VR11, VR12 is not exceeded. Potentiometers and rheostats are available with a specified minimum resistance value. If, for example, potentiometers of this type are selected for VR11 and VR12, then the currentlimiting circuit 8 may be omitted as shown in FIG. 5e.

Figure 6A:
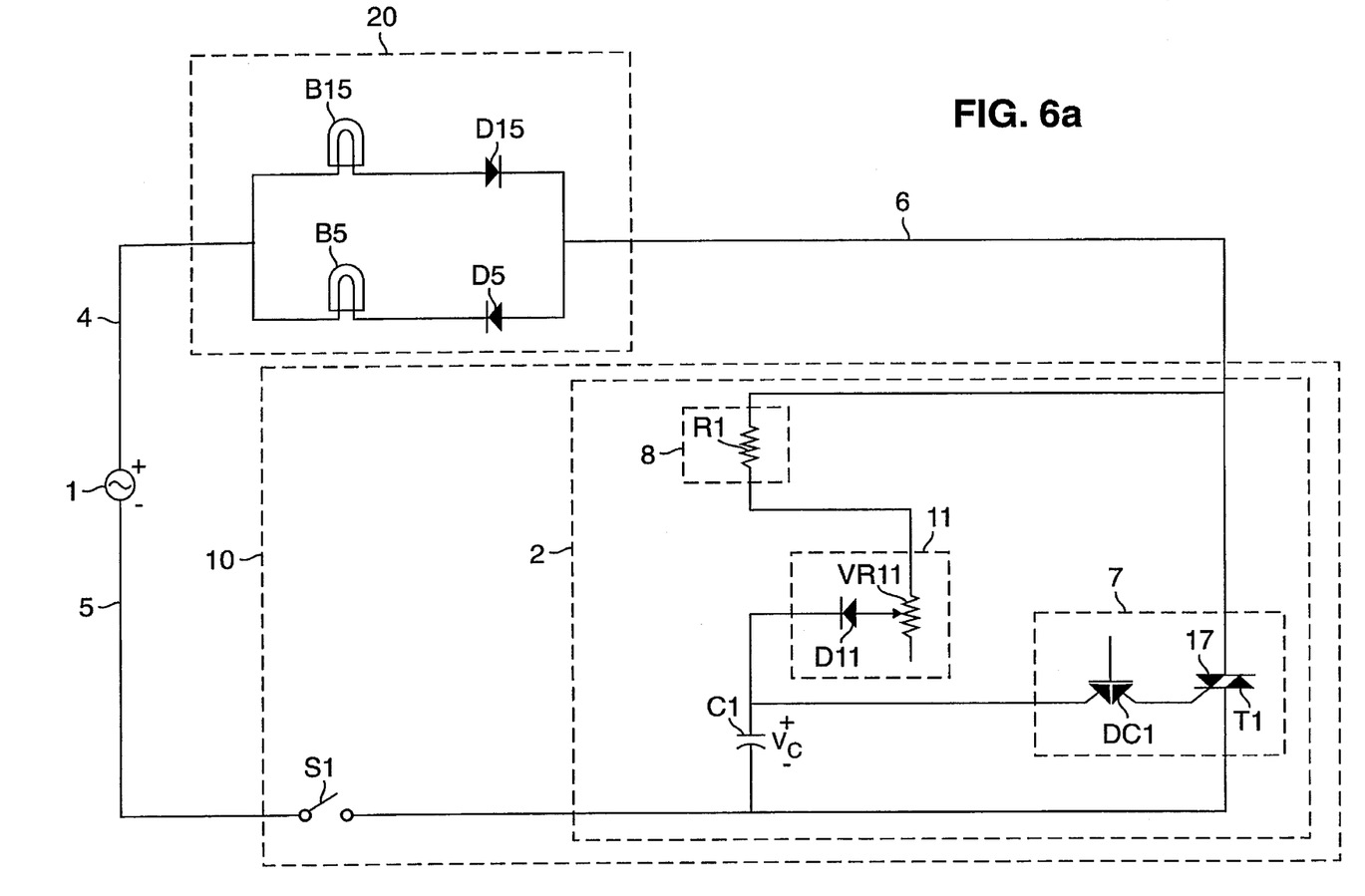
FIG. 6a is a schematic of a light dimming system that illustrates positive half cycle operation of the dimmer of FIG. 5b.
Figure 6B:
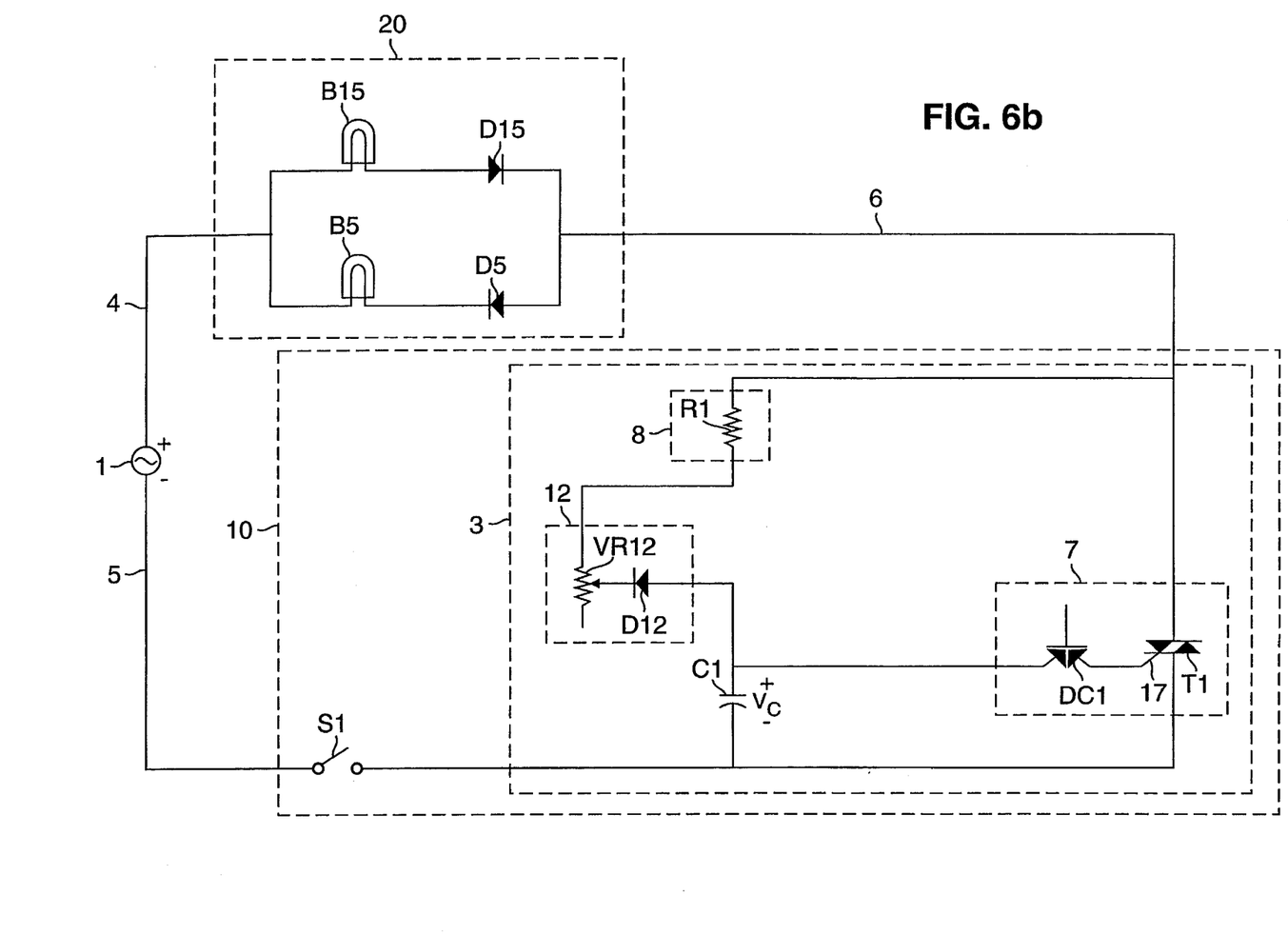
FIG. 6b is a schematic of a light dimming system that illustrates negative half cycle operation of the dimmer of FIG. 5b.

In the preferred embodiment in which the dimmer 10 is implemented as a phase-controlled switch, the positive half-cycle control circuit 2 and the negative half-cycle control circuit 3 of the dimmer 10 each comprises the load switching circuit 7 and part of the triggering circuit 9. As shown in FIG. 6a, the positive half-cycle control circuit 2 comprises the current-limiting circuit 8, the positive half-cycle charge-rate control circuit 11, the capacitor C1, and the load-switching circuit 7. In a like manner, the negative half-cycle control circuit 3 comprises the current limiting circuit 8, the negative half-cycle charge rate control circuit 12, the capacitor C1, and the load switching circuit 7, as shown in FIG. 6b.

The following paragraphs provide the detailed theory of operation for the preferred embodiment in which the dimmer 10 is implemented as a phase controlled switch. Refer to FIG. 5b.

The triac T1 may be triggered into conduction during each half cycle if the voltage $v_c$ across capacitor C1 is sufficiently high such that the diac DC1 breaks down and partially discharges the capacitor C1 into the gate 17 of the triac T1. If triggered, the triac T1 will continue to conduct for the remainder of the half cycle, during which time power is delivered to the load 20. When the triac T1 is not conducting, the capacitor C1 is charged by current which flows through the load 20, the current-limiting resistor R1 and either the potentiometer VR11 and the diode D11 or the potentiometer VRI2 and the diode D12.

During a positive half cycle, the diode D11 will be forward biased and the diode D12 will be reversed biased. Current will therefore flow through the potentiometer VR11, and the resistance of the potentiometer VR11 will control the charge rate of the capacitor C1. If the potentiometer VR11 is set to its maximum value, then the current charging the capacitor C1 will be at its minimum value. As a result, the voltage $v_c$ will be insufficient to break down the diac DC1, and the triac T1 will not be switched into conduction. As the resistance setting of the potentiometer VR11 is reduced, a larger current will flow through the reduced resistance, causing the capacitor C1 to charge faster so that the voltage $v_c$ will become sufficient to break down the diac DC1 at some point late in the half cycle. When the diac DC1 breaks down, the capacitor C1 will be partially discharged into the gate 17 of the triac T1, thus switching the triac into conduction for the remainder of the half cycle.

As described earlier, the bulb B15 will be energized during positive half-cycles. The bulb B15 will be dimly lit under the present conditions, since the triac T1 does not switch into conduction until late in a given half cycle. Further reductions in the resistance of the potentiometer VR11 cause correspondingly larger charging currents, with the result that the voltage $v_c$ becomes sufficient to break down the diac DC1 earlier in the half cycle. The bulb B15 will become correspondingly brighter as the triac T1 is now conducting for a greater percentage of the half cycle. Eventually, as the potentiometer VR11 is brought to minimum resistance, the triac T1 will conduct for essentially an entire positive half cycle. In that case, the bulb B15 will be at maximum brightness.

The operation of dimmer 10 during a negative half cycle is substantially identical to that described above for a positive half cycle, except that the diode D11 will now be reversed biased, and the diode D12 will be forward biased. Current will flow through the potentiometer VR12 instead of the potentiometer VR11, so that potentiometer VR12 controls the charge rate of capacitor C1 and, therefore, the triggering of the triac T1. During a negative half-cycle, the voltage $v_c$ will be negative. As previously described, the bulb B5 will be energized during a negative half cycle.

Other arrangements of components that achieve the functions of the triggering circuit 9 and the load switching circuit 7 will undoubtedly occur to those skilled in the art in view of the teachings of the present invention. Such variations are considered to be within the contemplated scope of the present invention.

There should be minimal interaction between the positive and negative channels. In other words, adjustment of either potentiometer VR11 or VR12 should control the selected channel but should not effect the other channel. In a preferred embodiment of the present invention, shown in FIG. 7, the dimmer 10 includes an interaction-reduction circuit 14. Before describing an exemplary embodiment of the interaction-reduction circuit, the manner in which the interaction problem arises will be discussed.

Figure 7:
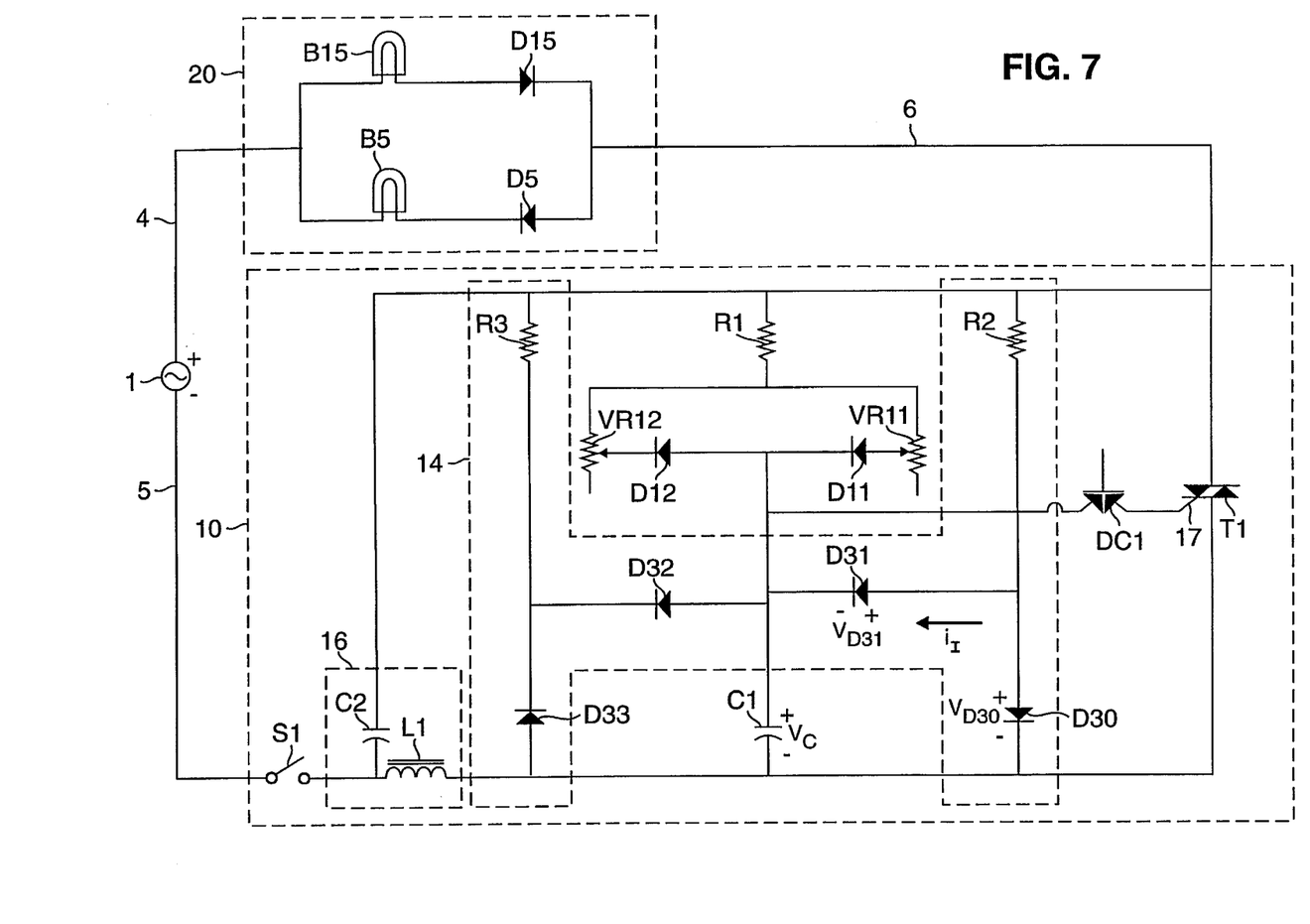
FIG. 7 is a schematic of the light dimming system of FIG. 5b, wherein the dimmer further includes a channel-interaction control circuit and an RFI filter.

Since the voltage $v_c$ determines when the triac T1 triggers during each half cycle, it follows that interaction results if the development of the voltage $v_c$ during one half cycle varies as a function of the voltage $v_c$ developed during the opposite half cycle. The voltage $v_c$ at the end of one half cycle constitutes the initial condition on the voltage $v_c$ for the opposite half cycle and consequently influences its development. Therefore, the potential exists for channel interaction if the voltage $v_c$ is not a constant value at the end of each half cycle. As described earlier, the capacitor C1 will be only partially discharged when voltage $v_c$ becomes sufficiently high to break down the diac DC1 and trigger the triac T1. This implies that voltage $v_c$ will be non zero at the end of the half cycle. Furthermore, if the voltage $v_c$ was not sufficient to break down the diac DC1, then the capacitor C1 will not have partially discharged, and the voltage $v_c$ at the end of the half cycle may be any value less than the breakdown voltage of the diac DC1. Hence, the initial condition of the voltage $v_c$ for one half cycle will vary with the conditions of the previous half cycle, causing interaction.

An interaction-reduction circuit 14 is preferably used in conjunction with the phase-controlled switch embodiment of the dimmer 10 to reset the voltage $v_c$ at the start of each half-cycle. This ensures that the voltage $v_c$ develops independently during each half cycle. An exemplary embodiment of such a circuit is shown in Teccor Electronics, Inc. "General Catalog—Semiconductors", Application Note AN1003 entitled "Phase Control Using Thyristors" at FIG. 12b, p. 112. The Application Note AN1003 is incorporated herein by reference. This embodiment of an interaction-reduction circuit is used in conjunction with the dimmer 10 in FIG. 7. The interaction-reduction circuit 14 comprises the resistors R2 and R3, along with diodes D30, D31, D32 and D33. The operation of these circuit elements is described below.

At the end of a negative half cycle, the voltage $v_c$ will be negative, as noted above. As the positive half cycle begins, the triac T1 will be non-conducting, having not yet been triggered. The diodes D32 and D33 will be reversed biased, so no current will flow through these diodes or the resistor R3. These elements are effectively removed from the circuit during the positive half cycle. Current from the generator 1 flows through the load 20, the resistor R1, the potentiometer VR11, and the diode D11 to begin discharging the capacitor C1 (i.e. the voltage $v_c$ becomes less negative). The discharging is accelerated by an additional current $i_I$ which flows through the diode D31, the resistor R2, the generator 1 and the load 20 until the negative voltage is eliminated. By eliminating the negative voltage $v_c$ which remains across the capacitor C1 at the end of the negative half cycle, the current $i_I$ suppresses negative-to-positive channel interaction. For proper positive channel operation, it is necessary that current $i_I$ be switched off when voltage $v_c$ reaches approximately zero volts, otherwise the current ix would rapidly develop a positive charge on the capacitor C1 independently of the rate selected by the potentiometer VR11.

The diodes D30 and D31 provide the switching action required to turn off the current $i_I$. The voltage $v_{D30}$ across the diode D30 is equal to the sum of the voltage $v_c$ and the voltage drop $v_{D31}$ across the diode D31. Since the diode D31 is forward biased at the start of the positive half cycle, the voltage $v_{D31}$ will be approximately equal to +0.7 volts. Therefore, the voltage $v_{D30}$ will be approximately the voltage $v_c$+0.7 volts. Initially, the voltage $v_c$ will generally be sufficiently negative such that the voltage $v_{D30}$ will also be negative. In this condition, the diode D30 will be reversed biased.

As the voltage $v_c$ decreases, the voltage $v_{D30}$ becomes less negative, passes through zero volts and eventually has a positive value. When the voltage $v_c$ reaches zero volts, the voltage $v_{D30}$ is approximately +0.7 volts. At this point, the diode D30 is forward biased, and clamps the voltage $v_{D30}$ to approximately +0.7 volts. A current continues flow through the diode D11, the potentiometer VR11, the current-limiting resistor R1, the generator 1 and the load 20, charging the capacitor C1 as the voltage $v_c$ becomes positive. As the voltage $v_c$ exceeds +0.7 volts, voltage $v_{D31}$ becomes negative, reverse biasing the diode D31. Thus, the current $i_I$ is switched off, so that the potentiometer VR11 determines the capacitor's C1 charge rate for the remainder of the positive half cycle.

Operation is similar during a negative half cycle, except that the initial voltage $v_c$ is now positive, and is removed by a current generated in the circuit consisting of the diodes D32, D33 and the resistor R3.

In the phase-controlled switch embodiment of the present invention, the dimmer 10 according to the present invention also includes an RFI filter 16, as shown in FIG. 7. The RFI filter may be, for example, an inductor L1 and a capacitor C2.

It should be recognized that other embodiments of an interaction-reduction circuit 14, or an RFI filter 16 suitable for use with the present invention will occur to those skilled in the art. Such embodiments are considered to be within the contemplated scope of the present invention.

Figure 8:
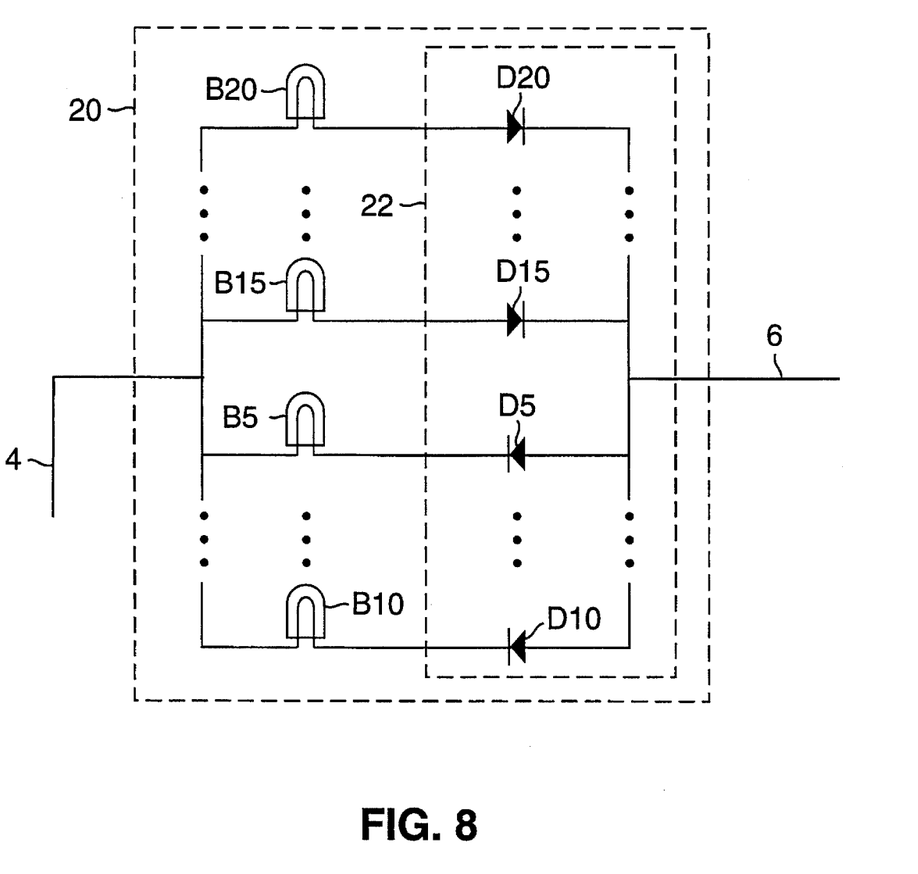
FIG. 8 is a schematic of an exemplary embodiment of a load comprising a plurality of light bulbs per channel and channel selection circuit comprising a diode wired in series with each light bulb.

It should be understood that any number of bulbs distributed in any manner between the channels may be used. An exemplary embodiment of a multiple bulb load is shown in FIG. 8. For the positive channel, a multiple bulb configuration is represented by the bulb B15 and the diode D15, the bulb B20 and the diode D20, and by dotted lines. The dotted lines signify that a number of bulbs and diodes in the configuration of the bulb-diode pairs B15–D15 and B20–D20 are connected in parallel to those pairs. In the same fashion, the bulb-diode pairs B5–D5 and B10–D10, in conjunction with the dotted lines, show a multiple bulb configuration for the negative channel. In practice, the limit on the number of bulbs and diodes is determined by factors such as the number of bulb sockets in the intended application, the total combined wattage of the bulbs on each channel, the designed capacity of the dimmer 10, and the current rating of the power source 1 and circuit wiring 4, 5 and 6.

The bulbs B5, B10, B15 and B20 may be standard incandescent bulbs, although reduced light output and lowered color temperature may result since bulbs designed for full cycle current will be operating on half cycle current. Reduced light output may be compensated for by substituting a higher wattage bulb, but this will generally not correct the color temperature. Preferably, halogen bulbs may be used, which, due to their higher color temperature, provide whiter light under half cycle operation than standard incandescent bulbs. In a preferred embodiment, a bulb specifically designed to operate on half cycle current is used. One such bulb is described in U.S. Pat. No. 4,897,578, the specification of which is incorporated herein by reference. This bulb is presently commercially available from Enterprise Lighting, Inc. of Richmond, Va. under the name "The Enterpriser®."

The diodes D5, D10, D15 and D20 may be of any physical style that accommodates placement within the fixture. While it would be possible to wire an axial leaded diode in series with the bulb socket, this is typically not a preferred approach since it may require modification of the fixture and does not facilitate channel reassignment. It is therefore preferable in many applications to use diodes which may be placed directly in the bulb socket. Such diodes are currently sold as bulb life extenders. One example is "The Button®," manufactured by Lemra Products, a division of J. Linmar International Ltd. of Boca Raton, Fla. Descriptions of such diodes are found in U.S. Pat. Nos. 3,963,956 and 3,450,893. The specification of each of these patents is incorporated herein by reference. In addition, "The Enterprise®" bulb previously mentioned includes a series connected diode, enabling it to be used directly with the dimmer 10.

An exemplary dimmer and lighting system according to the present invention may include components having the values and part numbers listed below. Of course, other values and part numbers could be used in other embodiments. Further, if AC power sources having amplitudes and/or frequencies other than 120 Volt/60 Hz are utilized, the component values of the dimmer 10 and the load 20 should be adjusted accordingly. For example, if the amplitude is increased, the voltage of the light bulbs should be increased a like amount and the voltage rating of some of the parts should be increased.

| Diodes: | D11, D12, D30, D31, D32, D33 - 1 amp., 200 volt, Part No. 1N4003; D5, D10, D15 and D20 - "The Button ®" by Lemra Products; |
|---|---|
| Resistors: | R1 - 3.3 kohm, 0.25 watt; R2, R3 - 15 kohm, 0.5 watt; VR11, VR12 - 250 kohm, 0.25 watt; |
| Capacitors: | C1 - 0.1 MFD, 50 volt; C2 - 0.1 MFD, 250 volt; |
| Inductors: | L1 - 10 microH; |
| Diac: | DC1 - 32 volts, Teccor Part No. HT32; |
| Triac: | T1 - 200 volts, 4 amp., Teccor Part No. Q2004L3; |
| Light Bulbs: | B5, B10, B15 and B20 - 100 watt, 120 V.; |

Teccor parts are available from Tecco Electronics, Inc., of Irving, Tex.

I claim:

1. A dimmer for controlling an amount of current supplied from an AC power source to a load in an AC circuit, the AC power source providing an AC signal having negative and positive half cycles, the dimmer comprising:

a positive half-cycle control circuit for controlling an amount of current flowing through the dimmer during the positive half cycles of the AC signal, the positive half-cycle control circuit comprising a load-switching circuit electrically connected to a triggering circuit, wherein the load-switching circuit delivers current to the load for a portion of positive half cycles, which portion of the positive half cycles is determined by a first part of the triggering circuit, and a negative half-cycle control circuit for controlling an amount of current flowing through the dimmer during the negative half cycles of the AC signal, the negative half-cycle control circuit comprising the load-switching circuit electrically connected to the triggering circuit, wherein the load-switching circuit delivers current to the load for a portion of negative half cycles, which portion of the negative half cycles is determined by a second part of the triggering circuit and wherein the positive and negative half-cycle control circuits are electrically connected to the AC source and the load.

2. The dimmer of claim 1 wherein the load switching circuit comprises a diac electrically connected to a triac.

3. The dimmer of claim 1 wherein the load switching circuit comprises a quadrac.

4. The dimmer of claim 1 wherein the first part of the triggering circuit comprises a positive half-cycle charge-rate control circuit electrically connected to a capacitor wherein the positive half-cycle charge-rate control circuit controls the rate at which charge is stored on the capacitor during positive half cycles, and the second part of the triggering circuit comprises a negative half-cycle charge-rate control circuit electrically connected to the capacitor wherein the negative half-cycle charge-rate control circuit controls the rate at which charge is stored on the capacitor during negative half cycles.

5. The dimmer of claim 4 wherein the positive half-cycle charge-rate control circuit comprises a first current-adjustment circuit electrically connected to a first steering circuit, wherein the first steering circuit permits only positive half cycles of current to flow to the first current-adjustment circuit and wherein the negative-half-cycle charge-rate control circuit comprises a second current-adjustment circuit electrically connected to a second steering circuit, wherein the second steering circuit permits only negative half cycles of current to flow to the second current-adjustment circuit.

6. The dimmer of claim 5 wherein the first and second current-adjustment circuits are variable resistors characterized by a rated power dissipation.

7. The dimmer of claim 6 wherein the triggering circuit further comprises a current-limiting circuit electrically connected to the first and second current-adjustment circuits to ensure that the rated power dissipation of the variable resistors is not exceeded.

8. The dimmer of claim 5 wherein the first and second current-adjustment circuits are variable resistors which incorporate a specified minimum resistance.

9. The dimmer of claim 5 wherein the first and second steering circuits are diodes.

10. The dimmer of claim 1 further comprising an interaction-reduction circuit electrically connected to the positive and negative half-cycle control circuits, wherein the interaction-reduction circuit minimizes electrical interaction between the positive half-cycle control circuit and the negative half-cycle control circuit.

11. The dimmer of claim 1 further comprising an RFI filter electrically connected between the AC power source and the positive and negative half-cycle control circuits.

12. A lighting system connected to an AC power source, the AC power source providing an AC signal having negative and positive half cycles, where the lighting system comprises:

(a) a load comprising at least two light bulbs, wherein at least one of the light bulbs is designed for half cycle current, and a channel-selection circuit; and (b) a dimmer, electrically connected between the AC power source and the load, for controlling an amount of current supplied to the load, the dimmer comprising a positive half-cycle control circuit for controlling an amount of current flowing through the dimmer during the positive half cycles and a negative half-cycle control circuit for controlling an amount of current flowing through the dimmer during the negative half cycles, where, through the action of the channel-selection circuit, one of the at least two light bulbs is energized by the positive half cycles of the AC signal, and the other of the at least two light bulbs is energized by the negative half cycles of the AC signal.

13. The lighting system of claim 12 wherein the channel-selection circuit comprises at least two diodes, one for each of the at least two light bulbs, where each diode is in series with one of the at least two light bulbs.

14. The lighting system of claim 12 wherein:

the positive half-cycle control circuit comprises a load-switching circuit electrically connected to a triggering circuit, wherein the load-switching circuit delivers current to the load for a portion of positive half cycles, which portion of the positive half cycle is determined by a first part of the triggering circuit, and wherein the negative half-cycle control circuit comprises the load-switching circuit electrically connected to the triggering circuit, wherein the load-switching circuit delivers current to the load for a portion of negative half cycles, which portion of the negative half cycle is determined by a second part of the triggering circuit.

15. The lighting system of claim 14 wherein the load switching circuit comprises a diac electrically connected to a triac.

16. The lighting system of claim 14 wherein the load switching circuit comprises a quadrac.

17. The lighting system of claim 14 wherein the first part of the triggering circuit comprises a positive half-cycle charge-rate control circuit electrically connected to a capacitor wherein the positive half-cycle charge-rate control circuit controls the rate at which charge is stored on the capacitor during positive half cycles, and the second part of the triggering circuit comprises a negative half-cycle charge-rate control circuit electrically connected to the capacitor wherein the negative half-cycle charge-rate control circuit controls the rate at which charge is stored on the capacitor during negative half cycles.

18. The lighting system of claim 17 wherein the positive half-cycle charge-rate control circuit comprises a first current-adjustment circuit electrically connected to a first steering circuit, wherein the first steering circuit permits only positive half cycles of current to flow to the first current-adjustment circuit and wherein the negative-half-cycle charge-rate control circuit comprises a second current-adjustment circuit electrically connected to a second steering circuit, wherein the second steering circuit permits only negative half cycles of current to flow to the second current-adjustment circuit.

19. The lighting system of claim 18 wherein the first and second current-adjustment circuits are variable resistors characterized by a rated power dissipation.

20. The lighting system of claim 19 wherein the triggering circuit further comprises a current-limiting circuit electrically connected to the first and second current-adjustment circuits to ensure that the rated power dissipation of the variable resistors is not exceeded.

21. The lighting system of claim 18 wherein the first and second current-adjustment circuits are variable resistors which incorporate a specified minimum resistance.

22. The lighting system of claim 18 wherein the first and second steering circuits are diodes.

23. The lighting system of claim 12 further comprising an interaction-reduction circuit electrically connected to the positive and negative half-cycle control circuits, wherein the interaction-reduction circuit minimizes electrical interaction between the positive hail-cycle control circuit and the negative half-cycle control circuit.

24. A method for independently controlling the brightness of two channels of light bulbs, where the light bulbs are part of a common AC circuit, the circuit including an AC power source providing an AC signal having positive and negative half cycles, the method comprising:
(a) independently controlling the positive and negative half cycles of the AC signal; and
(b) providing a first channel having at least one light bulb which is powered by the positive half cycles of the AC signal and providing a second channel having at least one light bulb which is powered by the negative half cycles of the AC signal wherein at least one of the light bulbs of either the first or the second channel is designed for half cycle current.

25. A lighting system connected to an AC power source, the AC power source providing an AC signal having negative and positive half cycles, where the lighting system comprises:
(a) a load comprising at least two light bulbs and a channel-selection circuit; and
(b) a dimmer, electrically connected between the AC power source and the load, for controlling an amount of current supplied to the load, the dimmer comprising
  (i) a positive half-cycle control circuit for controlling an amount of current flowing through the dimmer during the positive half cycles, the positive half-cycle control circuit comprising a load-switching circuit electrically connected to a triggering circuit, wherein the load-switching circuit delivers current to the load for a portion of positive half cycles, which portion of the positive half cycles is determined by a first part of the triggering circuit, and
  (ii) a negative half-cycle control circuit for controlling an amount of current flowing through the dimmer during the negative half cycles, the negative half-cycle control circuit comprising the load-switching circuit electrically connected to the triggering circuit, wherein the load-switching circuit delivers current to the load for a portion of negative half cycles, which portion of the negative half cycles is determined by a second part of the triggering circuit,
wherein, through the action of the channel-selection circuit, one of the at least two light bulbs is energized by the positive half cycles of the AC signal, and the other of the at least two light bulbs is energized by the negative half cycles of the AC signal.

26. The lighting system of claim 25 wherein the load switching circuit is selected from the group consisting of a quadrac, and a diac electrically connected to a triac.

27. The lighting system of claim 25 wherein the first part of the triggering circuit comprises a positive half-cycle charge-rate control circuit electrically connected to a capacitor wherein the positive half-cycle charge-rate control circuit controls the rate at which charge is stored on the capacitor during positive half cycles, and the second part of the triggering circuit comprises a negative half-cycle charge-rate control circuit electrically connected to the capacitor wherein the negative half-cycle charge-rate control circuit controls the rate at which charge is stored on the capacitor during negative half cycles.

28. The lighting system of claim 25 wherein the positive half-cycle charge-rate control circuit comprises a first current-adjustment circuit electrically connected to a first steering circuit, wherein the first steering circuit permits only positive half cycles of current to flow to the first current-adjustment circuit and wherein the negative half-cycle charge-rate control circuit comprises a second current-adjustment circuit electrically connected to a second steering circuit, wherein the second steering circuit permits only negative half cycles of current to flow to the second current-adjustment circuit.

* * * * *